United States Patent
Takanashi et al.

[11] Patent Number: 6,065,359
[45] Date of Patent: May 23, 2000

[54] MOUNT CONSTRUCTION OF A WEAR DETECTION PROBE FOR A BRAKE PAD

[75] Inventors: Hitoshi Takanashi; Kazuhiro Asao, both of Yokkaichi, Japan

[73] Assignee: Sumitomo Wiring Systems, Ltd., Japan

[21] Appl. No.: 09/227,363

[22] Filed: Jan. 8, 1999

[30] Foreign Application Priority Data

Jan. 13, 1998 [JP] Japan .................................. 10-005154
Feb. 2, 1998 [JP] Japan .................................. 10-021230

[51] Int. Cl.⁷ ........................................................ G01L 5/28
[52] U.S. Cl. ............................................. 73/866.5; 73/129
[58] Field of Search ............................... 73/7, 866.5, 121, 73/129; 340/454; 188/1.11 L; 200/61.4

[56] References Cited

U.S. PATENT DOCUMENTS

| | | |
|---|---|---|
| 3,479,640 | 11/1969 | Puma . |
| 4,274,511 | 6/1981 | Moriya . |
| 4,298,857 | 11/1981 | Robins et al. . |
| 4,641,519 | 2/1987 | Klein et al. . |
| 5,644,093 | 7/1997 | Wright et al. . |
| 5,767,768 | 6/1998 | DiSsaverio . |

FOREIGN PATENT DOCUMENTS 2-19637 3/1990 Japan .

*Primary Examiner*—Robert Raevis
*Attorney, Agent, or Firm*—Anthony J. Casella; Gerald E. Hespos; Michael J. Porco

[57] ABSTRACT

A mount construction of a wear detection probe for a brake pad is provided which is capable of absorbing an image caused by a contact of the wear detection probe with a rotor. Coil springs 42 are mounted on bolts 41 used to mount a bracket 30 on a support base 12, and the bracket 30 is held in close contact with the support base 12 by biasing forces thereof. When the probe 20 is brought into contact with a rotor upon the application of braking, the coil springs 42 are compressively deformed, thereby absorbing an impact caused by a contact of the rotor 10 and the probe 20. The mount construction of the probe 20 has an enhanced reliability by absorbing the impact on the probe 20.

10 Claims, 12 Drawing Sheets

MOUNT CONSTRUCTION OF A WEAR DETECTION PROBE FOR A BRAKE PAD

BACKGROUND OF THE INVENTION

1. Field of the Invention

The present invention relates to a mount structure of a wear detection probe for a brake pad.

2. Description of the Prior Art

The prior art includes a wear detection probe for detecting the wear of a brake pad of an automotive vehicle to determine when the brake pad can no longer be used or to determine when a conventional operating limit has been developed. A known construction for mounting this wear detection probe is disclosed in Japanese Unexamined Utility Model Publication No. 55-45070. As shown in FIG. 12, a mount hole 2a is formed in a mount plate 2 to which a brake pad 1 is secured, and a tubular collar 3 is fitted in the mount hole 2a. A locking portion 3a is formed in the inner surface of the collar 3 by cutting and bending a portion of the collar 3 inwardly. On the other hand, a sleeve 5 is fitted on a trunk of the wear detection probe 4, which is inserted into the collar 3 in this state. When the wear detection probe 4 is inserted into the collar 3, the locking portion 3a of the collar 3 is engaged with a flange 5a of the sleeve 5 upon the projection of the leading end of the wear detection probe 4 into the brake pad 1. Thus, the wear detection probe 4 is locked into the collar 3 and is accordingly fixed to the mount plate 2. When the brake pad 1 is worn to its operating limit, the wear detection probe 4 is also worn by being brought into sliding contact with the brake pad 1 and a rotor (brake disk) 6, thereby detecting the operating limit of the brake pad 1.

However in the above construction, there is a likelihood of a malfunction of the wear detection probe 4 by an impact caused when the wear detection probe 4 is brought into contact with the rotor 6.

Furthermore, in the construction for locking the wear detection probe 4 by the locking portion 3a, it is very difficult to detach the wear detection probe 4 once it is secured to the mount plate 2. Thus, upon a situation where the wear detection probe 4 needs to be exchanged, it has to be exchanged integrally with the brake pad and the like without being singly detached.

In view of the above problem, an object of the present invention is to provide a mount construction of a wear detection probe for a brake pad which has an improved operability.

SUMMARY OF THE INVENTION

According to the invention, there is provided to a mount construction for holding a wear detection probe which is adapted to detect that a brake pad has been worn to its limit due to its sliding contact with a rotor (brake disk). The wear detection probe is inserted into a probe mount hole formed through a support base for or at or on the brake pad such that a detection end of the wear detection probe projects into the brake pad. The mount construction comprises a bracket fitted or fittable on a rear end of the wear detection probe substantially opposite from the detecting end thereof. The mount construction further comprises one or more guide projections or portions which stand in positions of the support base at substantially opposite sides of the probe mount hole for displaceably supporting the bracket in the longitudinal direction thereof or in a direction substantially toward and from the support base. One or more elastic members are provided for biasing the bracket in such a direction as to be pressed against the support base.

Accordingly, the bracket fitted on the rear end of the wear detection probe normally is pressed against the support base by the elastic members. When braking is applied, after the brake pad has reached its abrasion limit, the wear detection probe is brought into contact with the rotor. At this time, the bracket is displaced in a direction away from the support base along the guide portions together with the wear detection probe, and the elastic members are deformed elastically between the bracket and the receiving members. As a result, an impact caused by a contact of the wear detection probe with the rotor is absorbed. Thus, this mount construction can have an enhanced reliability by preventing the impact on the wear detection probe.

According to a preferred embodiment of the invention, the elastic members are provided to be pulled between the bracket and receiving portions provided at the leading ends of the guide projections or portions.

The bracket preferably is held or holdable in substantially close contact with the opening edge of the probe mount hole.

Preferably, the wear detection probe is attachable to and detachable from the bracket with the bracket mounted on the support base. Accordingly, since the wear detection probe can be attached to and detached from the bracket with the bracket mounted on the support base, an exchange can be performed efficiently even in the case that only the probe needs to be exchanged.

Most preferably, the guide portions comprise bolts, and the receiving portions thereof are preferably bolt heads.

According to the invention, there is furthermore provided a mount construction, according to one or more of the preceding embodiments, for holding a wear detection probe. The wear detection probe is adapted to detect that a brake pad has been worn to its limit due to its sliding contact with a rotor, and is inserted into a probe mount hole formed through a support base for the brake pad. The mount construction comprises a flat bracket mounted substantially around or adjacent to the probe mount hole. The bracket is formed with an opening or hole which is substantially alignable with the probe mount hole and through which the wear detection probe is permitted to be inserted into the probe mount hole. The mount construction further comprises one or more hooks which are provided in positions of the bracket around or adjacent to the hole or opening so as to correspond in the mounted state to one or more bulging portions projecting from the wear detection probe. The hooks are so formed as to be engageable with the corresponding bulging portions to lock the wear detection probe by rotating the wear detection probe in a specified direction about the longitudinal axis thereof with the wear detection probe mounted in the probe mount hole. Receiving openings of the hooks are provided for receiving the bulging portions of the wear detection probe. The receiving openings are deformable elastically and are normally narrow to prevent the bulging portions from being disengaged from the hooks.

Accordingly, when the wear detection probe is inserted into the probe mount hole and the bulging portions are rotated in the specified direction while being held in contact with the opening edge of the probe mount hole or bracket, the bulging portions are slipped under the hooks as the receiving openings of the hooks are deformed elastically. Thus the wear detection probe is held so as not to come out. At this time, the receiving openings are restored and made narrow, preventing the bulging portions from being disengaged from the hooks.

On the other hand, if the wear detection probe is rotated in an opposite direction, the bulging portions are disengaged from the hooks while forcibly widening the receiving openings, permitting the detachment of the wear detection probe from the probe mount hole.

With the inventive construction, the probe easily can be attached and detached. Therefore, an exchange can be performed efficiently even in the case that only the probe needs to be exchanged.

According to a further preferred embodiment of the invention, a handle for rotating the wear detection probe projects from the rear end surface of the wear detection probe. Accordingly, the wear detection probe can be rotated easily since the handle is provided on the rear end surface thereof.

Preferably, the brackets are provided with at least one accommodating portion which is bent substantially triangularly in a direction away from the support base, preferably at an intermediate portion of a tongue extending in a tangent direction of the opening.

Most preferably, the brackets are provided with a guide portion obliquely extending in a direction away from the support base at the leading end of a tongue extending in a tangent direction of the opening.

These and other objects, features and advantages of the present invention will become more apparent upon a reading of the following detailed description and accompanying drawings.

DETAILED DESCRIPTION OF THE PREFERRED EMBODIMENTS

Figure 1:
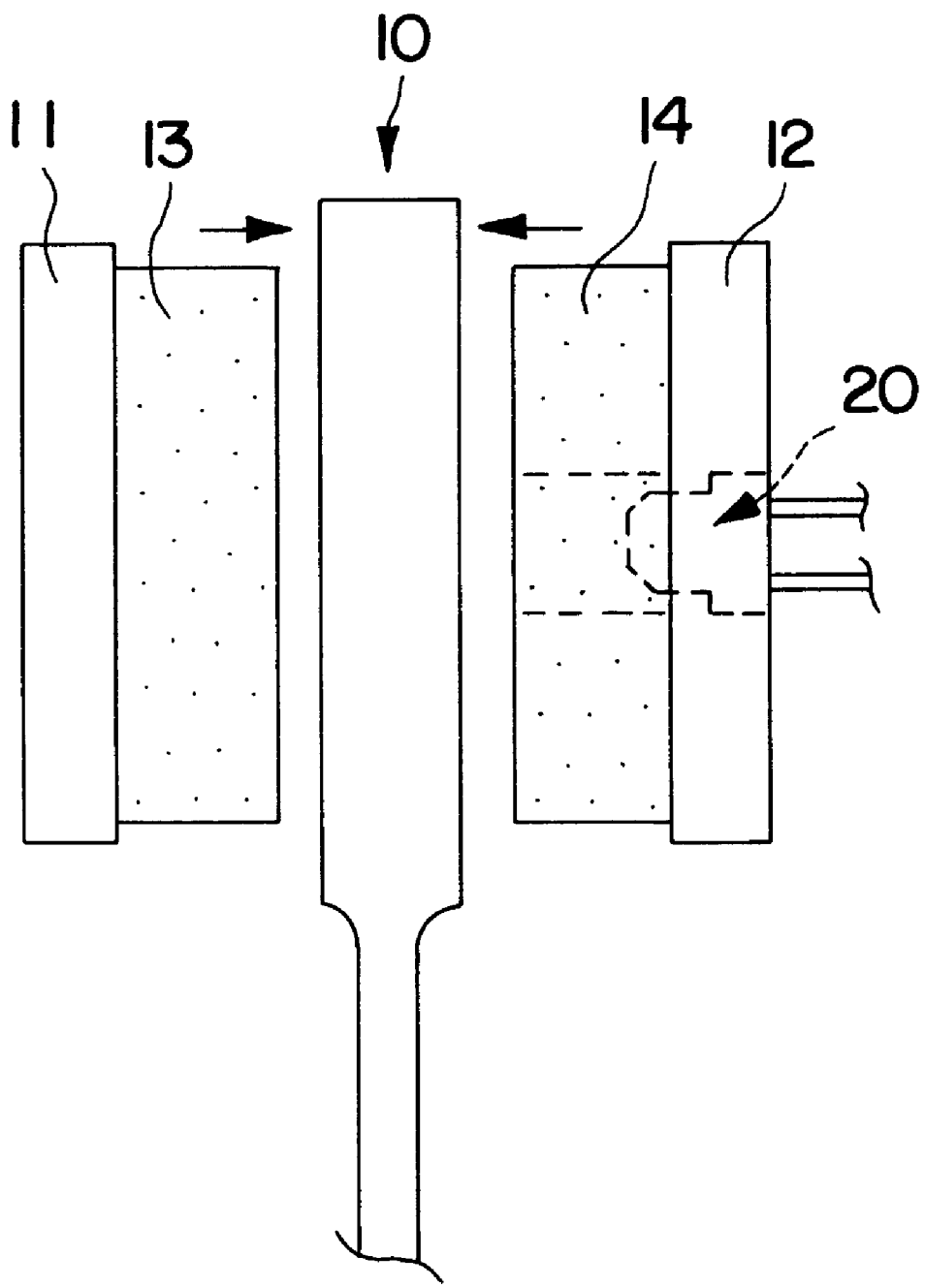
FIG. 1 is a side view of a braking device according to one embodiment of the invention.

FIG. 1 shows a braking device with a disk-shaped rotor 10. A pair of support bases 11, 12 are arranged on opposite sides of the rotor 10, and brake pads 13, 14 are mounted on the surfaces of the support bases 11, 12 toward the rotor 10. The support bases 11, 12 are displaceable toward the rotor 10 by an unillustrated driving device, thereby pressing the brake pads 13, 14 against the rotor 10. Frictional forces between the rotor 10 and the brake pads 13, 14 stop or reduce the rotational speed of the rotor 10.

Figure 2:
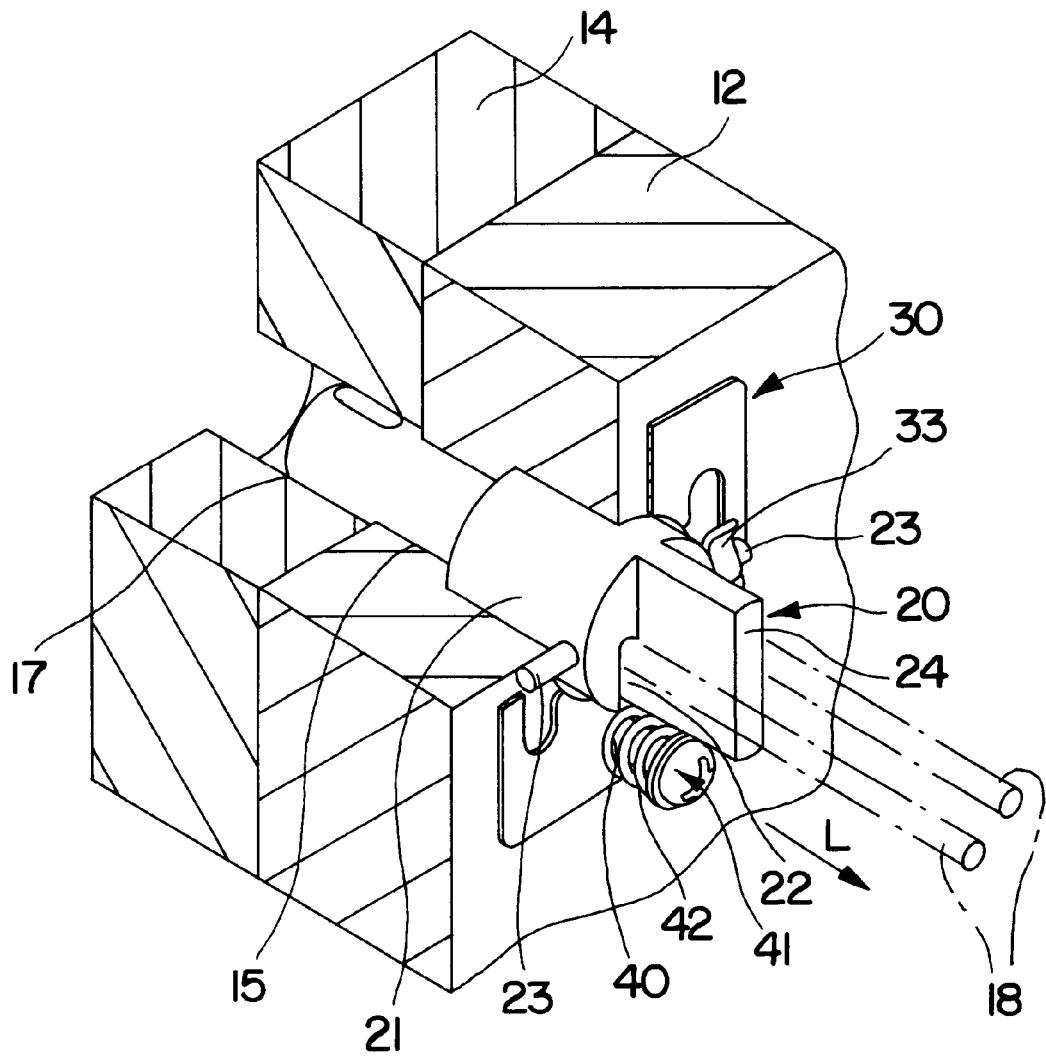
FIG. 2 is a perspective view of a support base having a probe mounted thereon.

A wear detection probe 20 (hereinafter, merely "probe 20") is mounted or mountable by being inserted into a probe mount hole 15 formed in one support base 12, and the leading end of the probe 20 at least partially projects or is projectable into a through hole 17 formed in the brake pad 14 as shown in FIG. 2.

Figure 3:
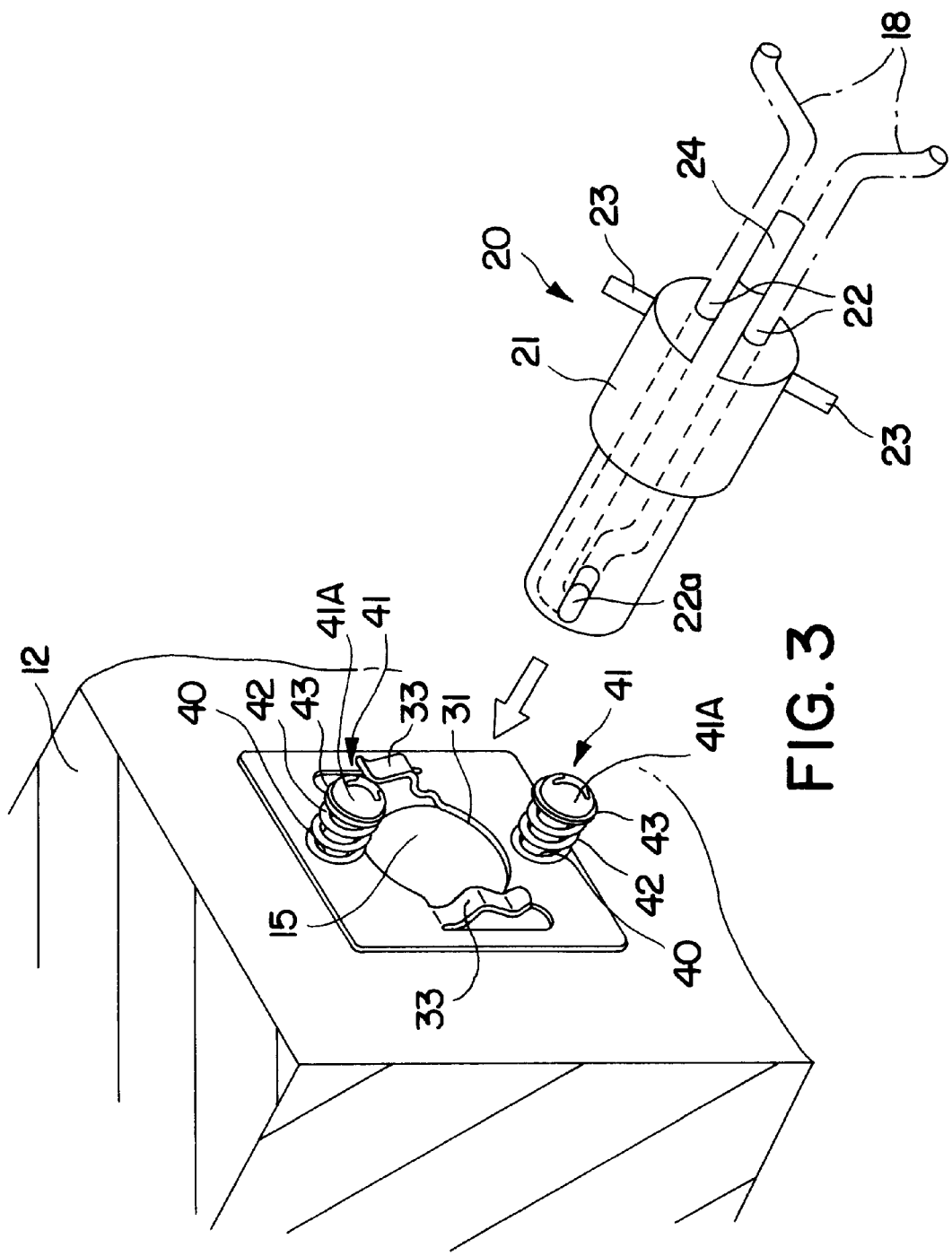
FIG. 3 is an exploded perspective view of the probe.

The probe 20 is provided with a probe main body 21 made e.g. of a synthetic resin and shaped such that the leading end of a substantially cylindrical body is stepped or recessed so as to have a narrow portion as shown in FIG. 3. A pair of substantially parallel wire grooves 22 are formed in the probe main body 21 and extend substantially from its rear end toward its leading end. The grooves 22 are connected via a communicating portion 22a at the leading end of the probe main body 21. Portions of a wire 18 folded substantially at the communicating portion 22a are drawn substantially along the wire grooves 22 through the rear end surface of the probe main body 21. An unillustrated breakage detector is connected with ends of the drawn portions of the wire 18 to generate a warning, e.g. to turn a warning lamp on, when the wire 18 is broken as the wear of the brake pad 14 progresses.

A pair of rotary bars 23, preferably having a substantially circular cross section, project in substantially opposite directions from the rear end of the outer surface of the probe main body 21. A grip 24 in the form of a projection is formed on the rear end surface of the probe main body 21, and the probe 20 is rotated or rotatable by gripping this grip 24.

A bracket 30 made of a sheet metal is mounted substantially around the opening edge of the probe mount hole 15. The bracket 30 preferably has a substantially square shape as shown in FIG. 3 and is formed in its center with a substantially round hole 31 through which the probe 20 is insertable. The bracket 30 may be formed with an opening (not shown) arrangeable at or adjacent to the probe mount hole 15. The bracket 30 is so mounted or mountable around or at the opening edge of the probe mount hole 15 as to substantially align the round hole 31 with the probe mount hole 15.

Bolt holes 40 are formed in upper and lower sides of the bracket 30 in FIG. 3, and bolts 41 are or can be screwed into internally-threaded holes formed in the support base 12 through the bolt holes 40. A coil spring 42 is mounted or mountable on each bolt 41, and is pulled between a washer 43 in close contact with a bolt head 41A and the bracket 30. The coil springs 42 are capable of undergoing a compressive deformation, so that the bracket 30 is displaceable in a direction substantially away from the support base 12 along the bolts 41. It should be noted that the internally-threaded holes have such a depth that only the leading ends of the bolts 41 are insertable and that the bolts 41 are secured not to rotate by, e.g. an adhesive or other locking means.

On the left and right sides of the round hole 31 of the bracket 30 in FIG. 3, a pair of hooks 33 substantially corresponding to the rotary bars 23 are formed so as to be substantially symmetrical with respect to a symmetry point. The symmetry point preferably is positioned substantially in or corresponding to the center of the probe mount hole 15. Each hook 33 is such that an intermediate portion of a tongue substantially extending in a tangent direction of the round hole 31 is bent triangularly away from the support base 12 and the leading end of the tongue extends obliquely away from the support base 12. Furthermore a distal end of the hooks 33 preferably is bent in such a direction so as to be oblique and extending at an angle different from 0° or 180° with respect to and away from a plane of the bracket 30 and/or the support base 12.

To mount the probe 20 on the braking device, the bracket 30 is first mounted on the support base 12. This can be done merely by inserting the bolts 41 through the washers 43 and the coil springs 42 and further through the bolt holes 40 of the bracket 30 and screwing or mounting or fixing them into the internally-threaded holes of the support base 12. As a result, the bracket 30 is pushed by the coil springs 42 into close contact with the support base 12.

Figure 4:
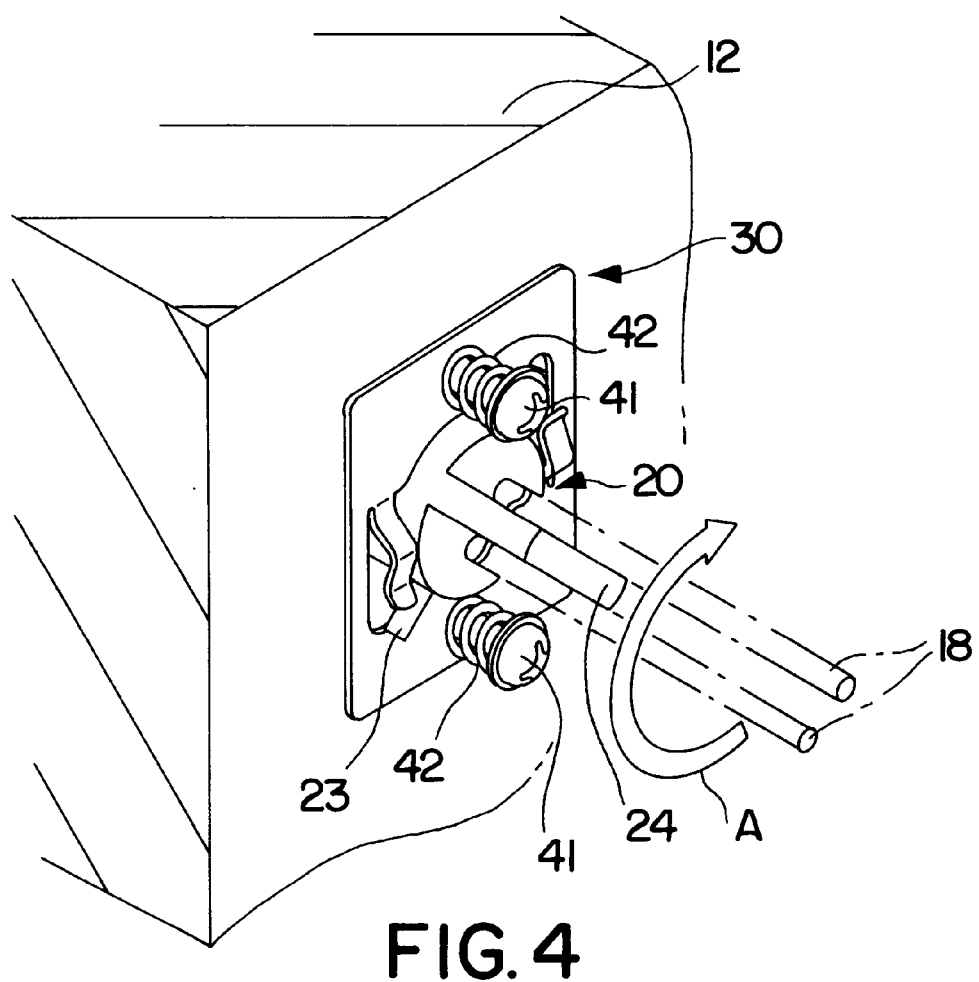
FIG. 4 is a perspective view of the probe inserted into a probe mount hole.
Figure 5:
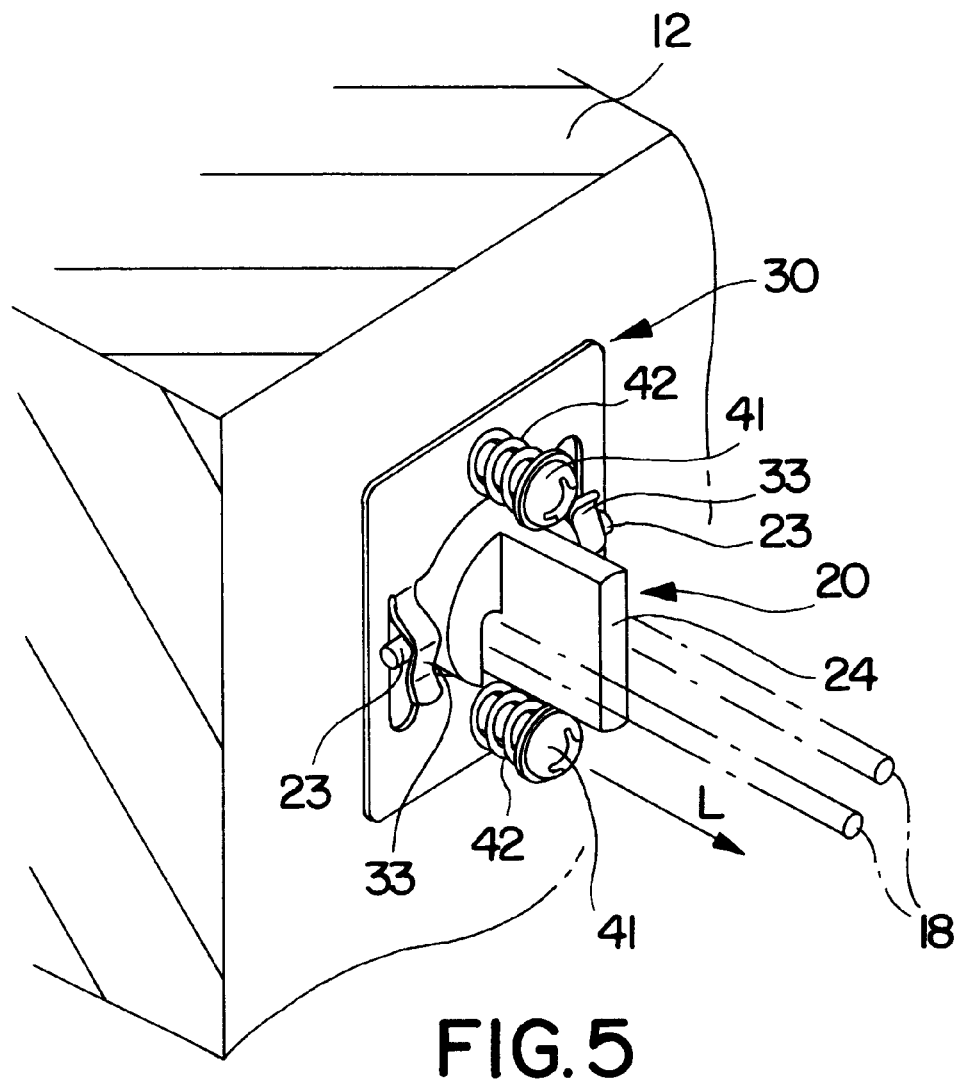
FIG. 5 is a perspective view of the probe rotated to its locked position.

Subsequently, the probe 20 is mounted on the bracket 30. This is done by inserting the probe 20 into the probe mount hole 15 of the support base 12 while gripping preferably the grip 24 (see FIG. 3). Then, as shown in FIG. 4, the rotary bars 23 of the probe 20 are brought substantially into contact with or to a position close to the bracket 30 that has been secured to the support base 12. Preferably the bars 23 are brought into positions that are displaced rotatably from the hooks 33. At this time, the leading end of the probe 20 is projecting into the through hole 17 of the brake pad 14 (see FIG. 2). The probe 20 is then rotated in a direction of arrow A of FIG. 4 by turning the grip 24. Accordingly, the rotary bars 23 of the probe 20 are rotated to be brought into contact with the leading ends of the hooks 33. When the grip 24 is further turned, the hooks 33 are elastically deformed and/or the bracket 30 is displaced, at least partially, in a direction away from the support base 12 due to the spring mounting and the rotary bars 23 are accommodated in the hooks 33. Thereupon, the hooks 33 are restored substantially to or positioned in their original shape and the probe 20 is lockingly held in the probe mount hole 15. In this way, the mounting of the probe 20 is completed.

If braking is applied after the brake pad 14 reached a wear limit by a sliding contact with the rotor 10 (see FIG. 1), the probe 20 is brought into contact with the rotor 10. Here, the rotary bars 23 of the probe 20 and the hooks 33 are engaged with each other, and the bracket 30 is pushed together with the probe 20. Then, the bracket 30 is displaced at least partially away from the support base 12 along the longitudinal direction L of the bolts 41, and the coil springs 42 are compressively deformed between the bracket 30 and the bolt heads 41A, with the result that an impact caused by the contact of the rotor 10 and the probe 20 is absorbed. The probe 20 is abraded by being pressed against the rotor 10 by a counteracting force. When the folded portion of the wire 18 inside the probe 20 is cut, the unillustrated warning lamp is turned on to notify a driver thereof.

As described above, the mount construction of the probe 20 according to this embodiment can have an enhanced reliability by absorbing an impact on the probe 20. Further, the probe 20 is pressed against the rotor 10 by the counteracting forces of the coil springs 42. This advantageously prevents the probe 20 from being excessively strongly pressed against the rotor 10. Furthermore, since the probe 20 can be attached to and detached from the bracket 20 with the bracket 30 mounted on the support base 12, an exchange can be performed efficiently even in the case that only the probe 20 needs to be exchanged.

The present invention is not limited to the described and illustrated (FIGS. 1 to 6) embodiment, but the following embodiments are also embraced by the technical scope of the present invention as defined in the claims. Besides the following embodiments, a variety of other changes can be made without departing from the scope and spirit of the invention as defined in the claims. Although the bracket 30 is made of a sheet metal in the foregoing embodiment, it may be made of a synthetic resin. Although the bracket 30 is mounted via two bolts 41 in the foregoing embodiment, it may be mounted via three or more bolts.

Figure 6:
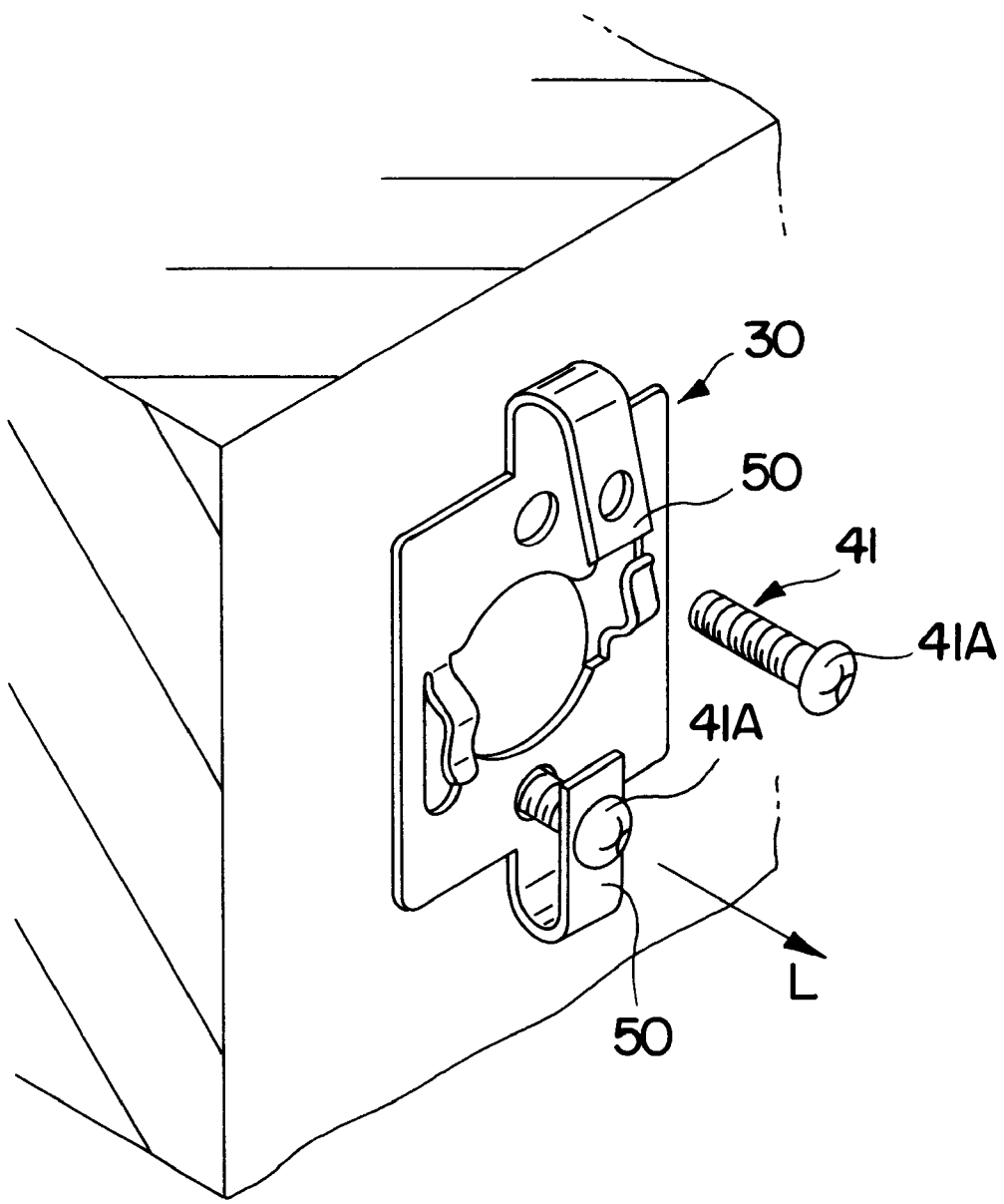
FIG. 6 is a perspective view of a modification.
Figure 7:
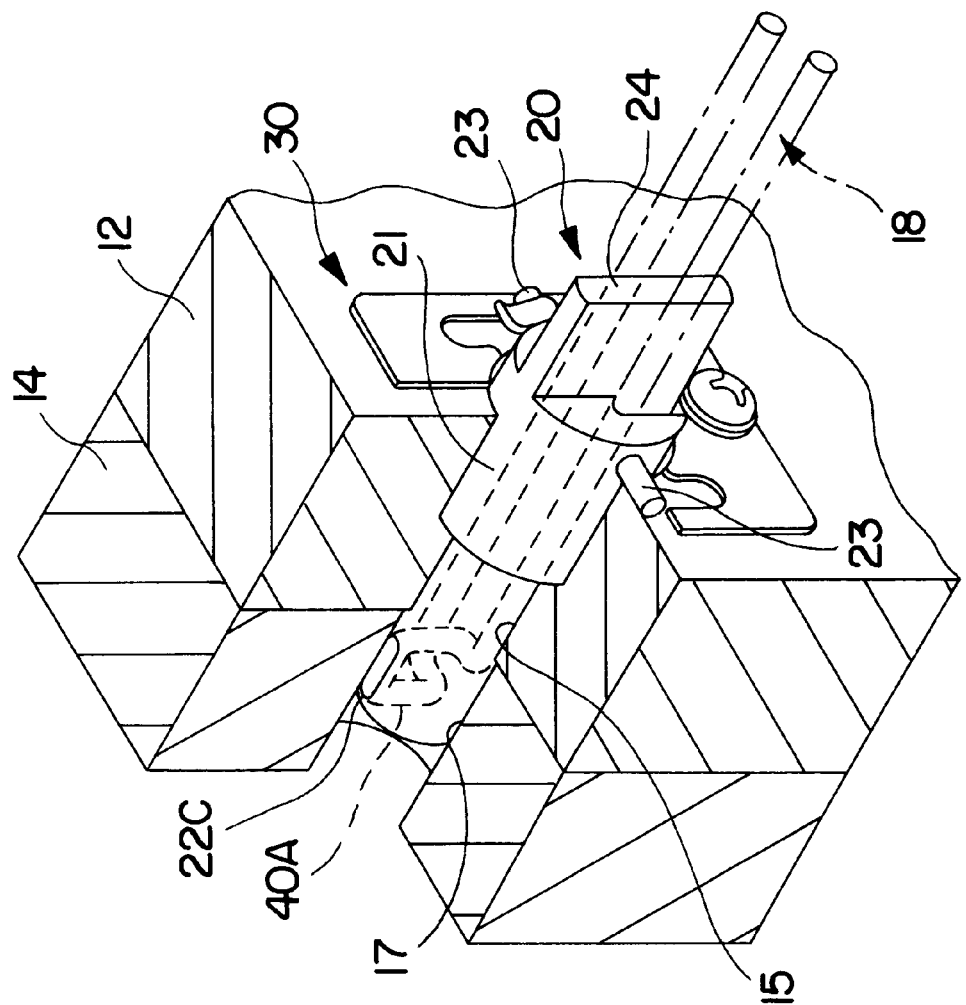
FIG. 7 is a perspective view of a support base having a probe mounted thereon.
Figure 7:
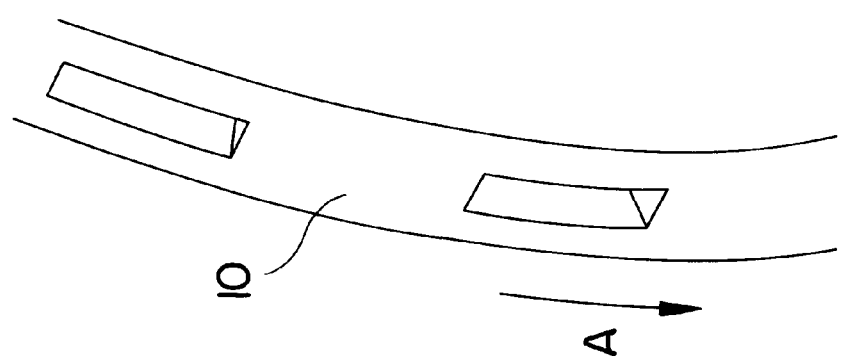

Although the elastic members are the coil springs 42 in the foregoing embodiment, they may be leaf springs 50 extending from the bracket 30 as shown in FIG. 6. The leaf springs 50 may be folded and have the leading ends thereof securely engaged with the bolt heads 41A so as to be pulled between the bracket and the bolt heads 41A.

Although the elastic members are the coil springs 42 or leaf springs 50 in the foregoing embodiments, they may be formed in the shape of elastically deformable cylinders or tubes, e.g. of a rubber tube or perforated block or the like.

Figure 8:
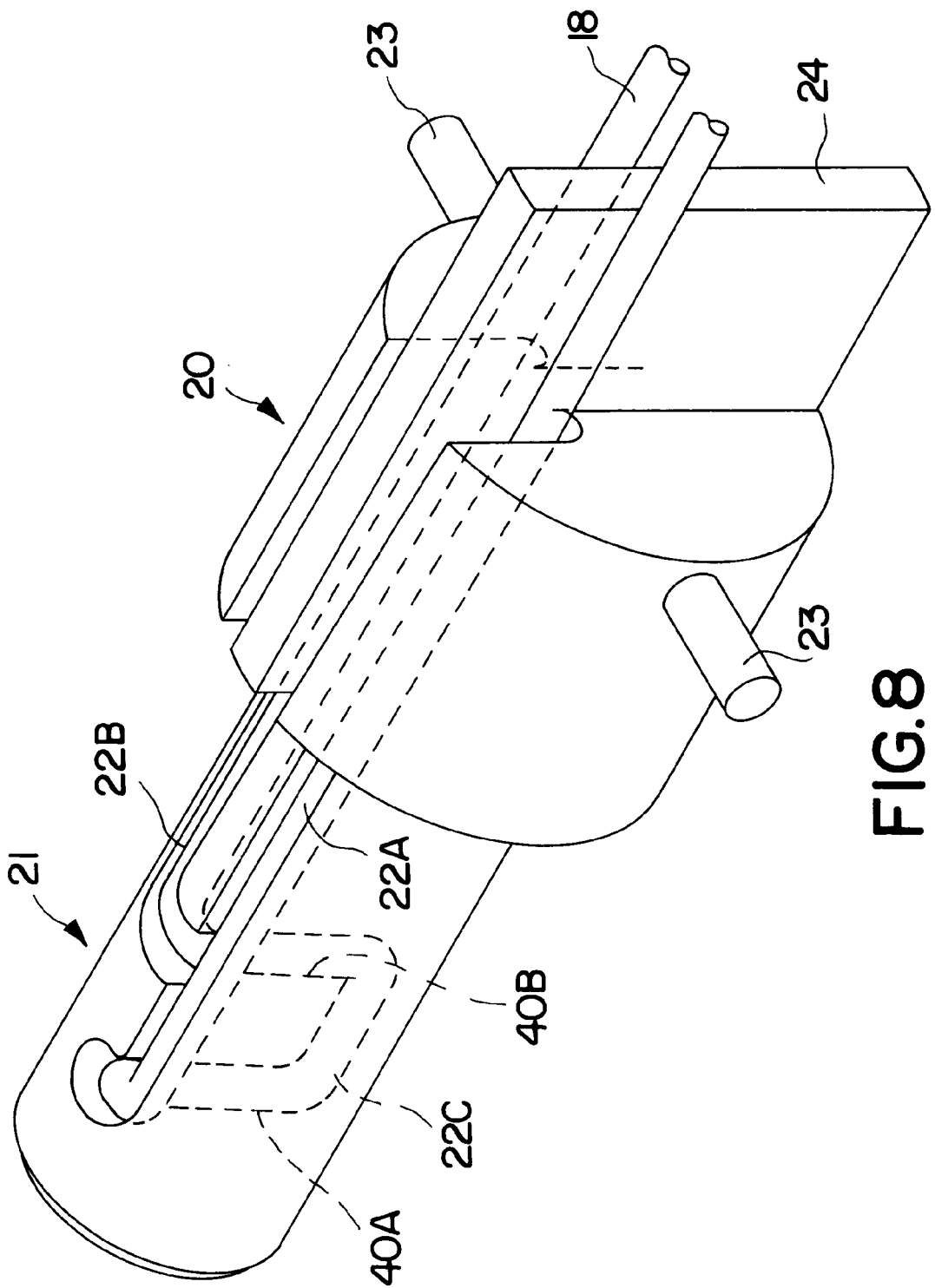
FIG. 8 is a detailed perspective view of the probe.

Another embodiment of the invention is described with reference to FIGS. 1 and 7 to 11. In this embodiment, the probe 20 is provided with a probe main body 21 made of a synthetic resin and shaped such that the leading end of a cylindrical body is stepped to have a narrow portion as shown in FIG. 8. A pair of wire grooves 22A, 22B are formed substantially in parallel to each other substantially from the rear end to the leading end in the upper side of the outer surface of the probe main body 21 in FIG. 8. One wire groove 22A communicates with a vertical hole 40A extending along the vertical direction of FIG. 8 at the leading end of the probe main body 21, and the other wire groove 22B communicates with a vertical hole 40B extending substantially along the vertical direction of FIG. 8 and located substantially behind or longitudinally displaced with respect to the vertical hole 40A. These two vertical holes 40A, 40B communicate with a short wire groove 22C formed in the lower side of the outer surface of the probe main body 21 in FIG. 8. A wire 18 fitted in the wire grooves 22A, 22B is folded by being passed through the front vertical hole 40A, the short wire groove 22C and the rear vertical hole 40B. An unillustrated breakage detector is connected at the ends of the drawn portions of the wire 18. When the wire 18 is cut as the abrasion of the brake pad 14 progresses, a warning lamp is turned on.

A pair of rotary bars 23, preferably having a substantially circular cross section, project in substantially opposite directions from the rear end of the outer surface of the probe main body 21. The rotary bars 23 extend in a direction at an angle different from 0° or 180°, preferably substantially normal to the extension of the vertical hole 40A. When the rotary bars 23 are locked with hooks 33, to be described, the vertical hole 40A is oriented in the rotating direction of the rotor 10 (tangent direction of the rotor 10, see direction A in FIG. 7).

A handle 24 in the form of a projection is formed on the rear end surface of the probe main body 21, and the probe 20 is rotated preferably by gripping this handle 24.

Figure 9:
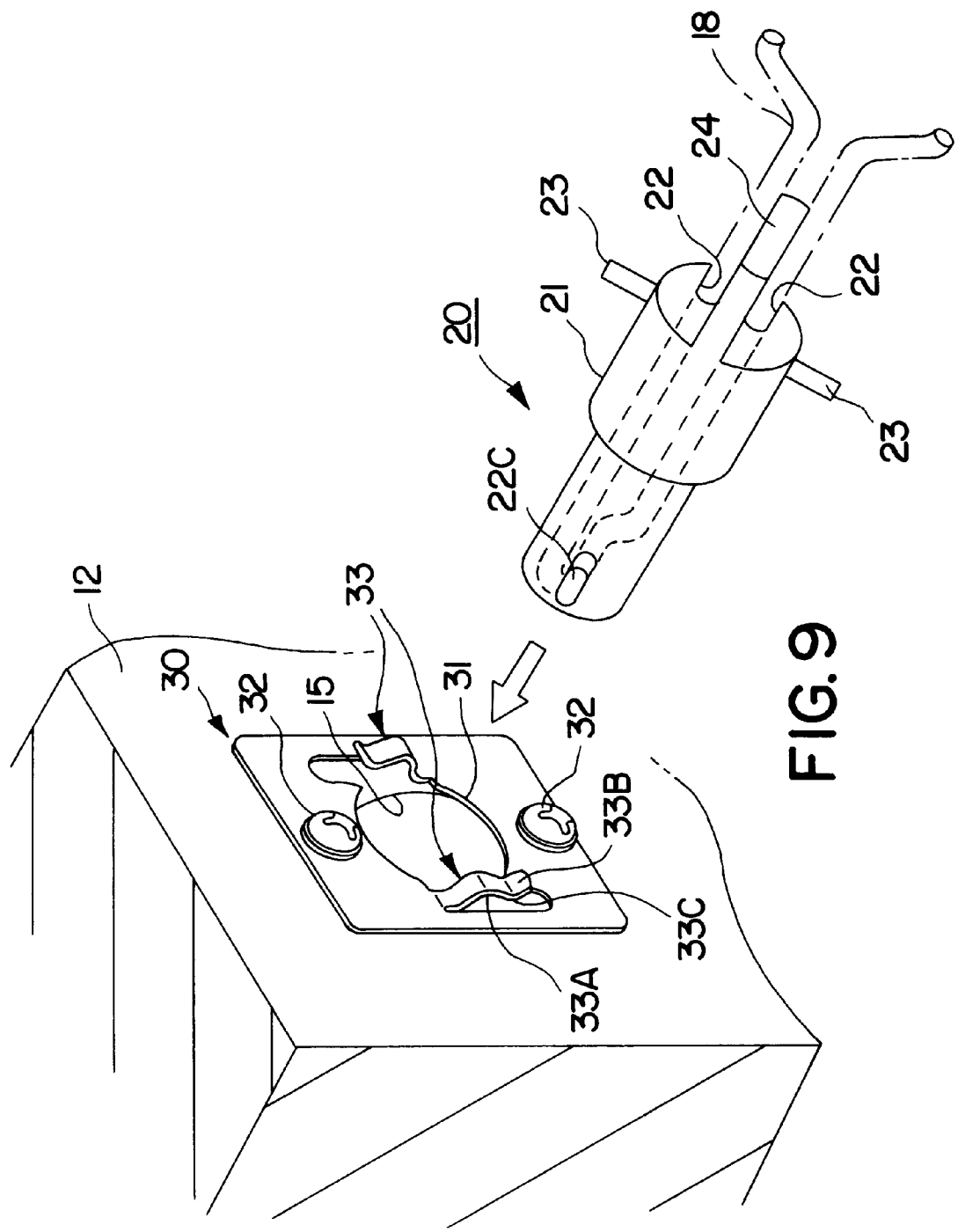
FIG. 9 is an exploded perspective view of the probe.

A bracket 30 made of a sheet metal is mounted around the opening edge of the probe mount hole 15. The bracket 30 preferably has a substantially square shape as shown in FIG. 9 and is formed in its center with a substantially round hole 31 through which the probe 20 is insertable. The bracket 30 is mounted or mountable around the opening edge of the probe mount hole 15 so as to align the round hole 31 with the probe mount hole 15. Bolts 32 are fitted preferably at the upper and lower edges of the bracket 30 in FIG. 9, and the bracket 30 is secured to the support base 12 by fastening the bolts 32.

On the left and right sides of the round hole 31 of the bracket 30 in FIG. 9, a pair of hooks 33 corresponding to the rotary bars 23 are formed so as to be substantially symmetrical with respect to a point. Each hook 33 is provided with an accommodating portion 33A which is bent substantially triangularly or concavely in a direction away from the support base 12 at an intermediate portion of a tongue extending in a substantially tangent direction of the round hole 31 and a guiding part 33B obliquely extending in a direction away from the support base 12 at the leading end of the tongue. At the base end of each guiding part 33B is defined (between the plane of the bracket 30 and the portion of the hooks 33 between the guiding part 33B and the accommodating portion 33A) a receiving opening 33C narrower than the diameter of the rotary bars 23.

Figure 10:
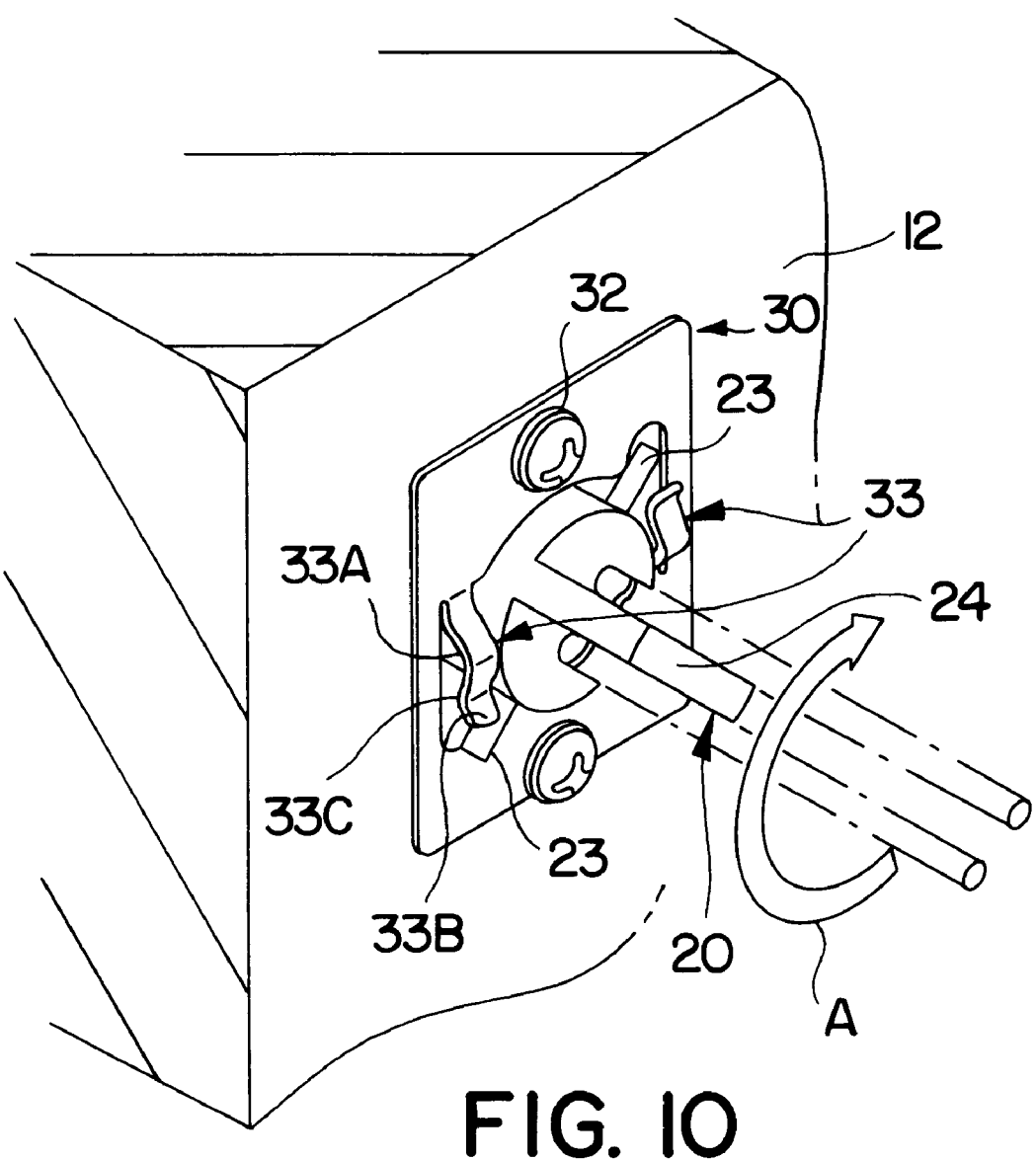
FIG. 10 is a perspective view of the probe inserted into a probe mount hole.
Figure 11:
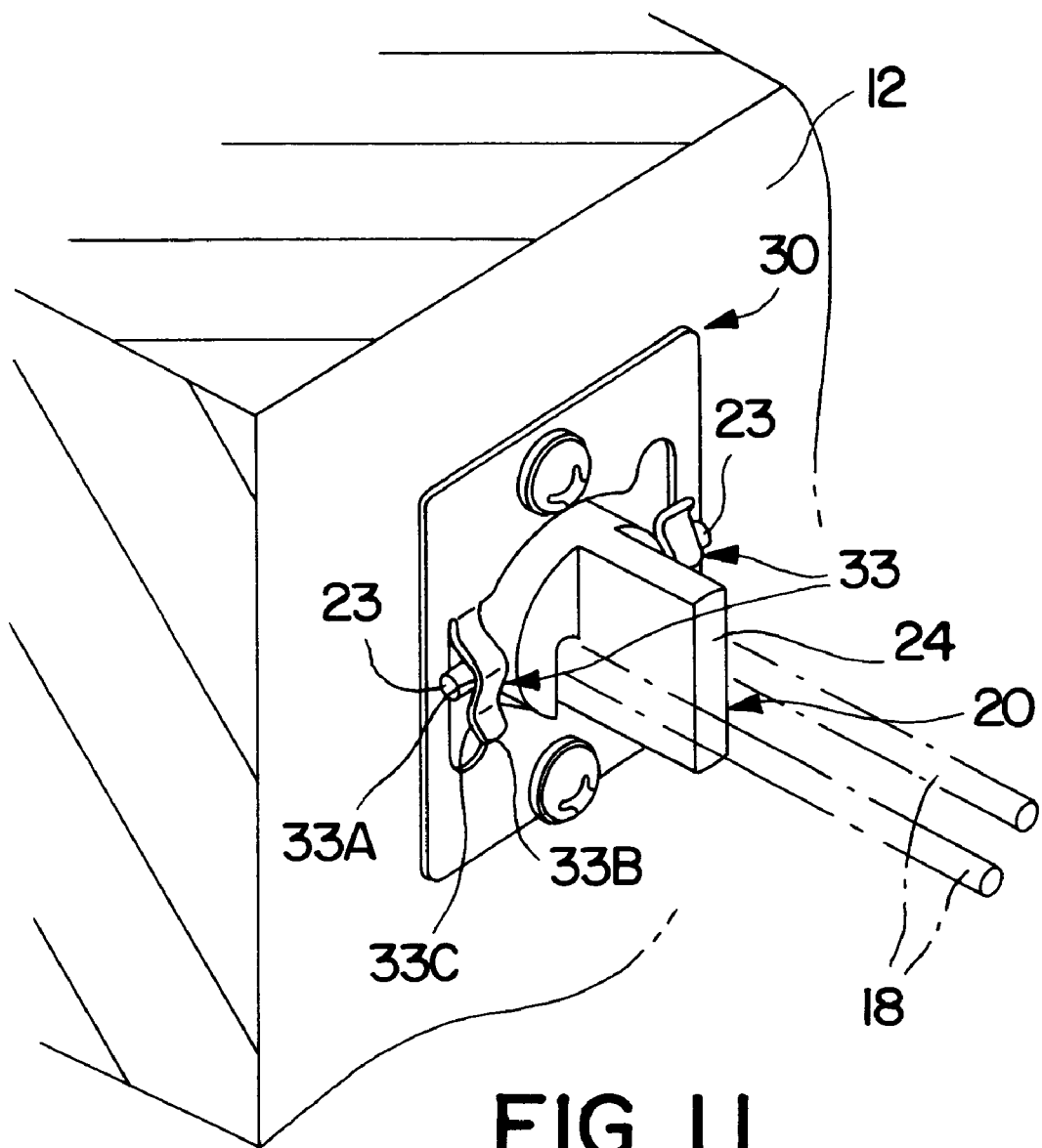
FIG. 11 is a perspective view of the probe rotated to its locked position.
Figure 12:
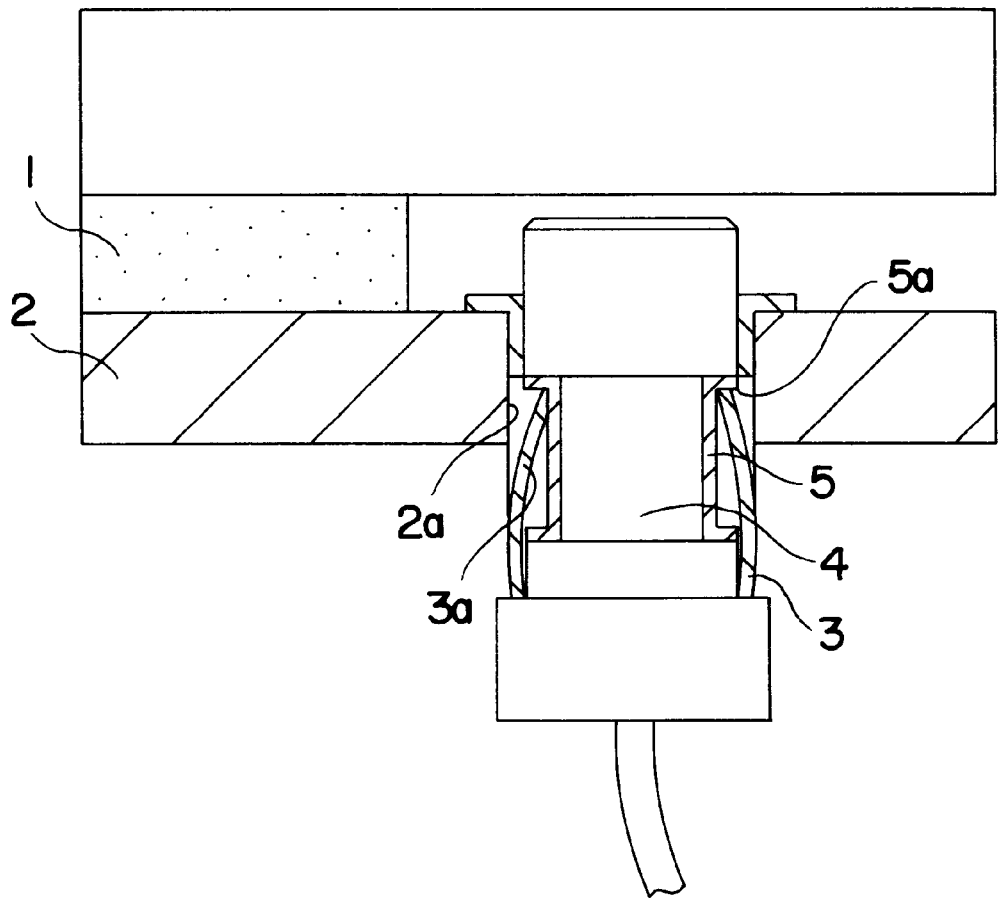
FIG. 12 is a perspective view of a prior art probe.

To mount the probe 20 on the braking device, the probe 20 is inserted into the probe mount hole 15 of the support base 12 preferably while gripping the handle 24 (see FIG. 9). Then, as shown in FIG. 10, the rotary bars 23 of the probe 20 are brought into contact with the bracket 30 secured to the support base 12. At this time, the leading end of the probe 20 is projecting into the through hole 17 of the brake pad 14 (see FIG. 7). The probe 20 then is rotated in a direction of arrow A of FIG. 10 by turning the handle 24. Then, the rotary bars 23 of the probe 20 are rotated to be obliquely brought into contact with the guide portions 33B of the hooks 33 of the bracket 30. When the probe 20 is further rotated in this state, the rotary bars 23 are slipped under the hooks 33 by being guided by the guide portions 33B, thereby (preferably elastically) widening the receiving openings 33C of the hooks 33. Consequently, the hooks 33 are restored substantially to their original shape after the rotary bars 23 are fitted into the accommodating portions 33A. In this way, the mounting of the probe 20 is completed and the probe 20 is locked in the probe mount hole 15.

The probe 20 may try to rotate when the braking device is subjected vibrations or the like. However, since the receiving openings 33C at the open sides of the hooks 33 are narrower than the diameter of the rotary bars 23, the rotary bars 23 are not disengaged from the hooks 33. This prevents the probe 20 from coming out of the probe mount hole 15 due to its inadvertent rotation.

When braking is applied and the brake pad 14 reaches its abrasion limit due to its sliding contact with the rotor 10 (see FIG. 7), the rotor 10 comes into sliding contact with the leading end of the probe 20. Here, since the disengagement of rotary bars 23 of the probe 20 from the support base 12 is restricted by the hooks 33, the probe 20 is abraded by the sliding contact with the rotor 10 without coming out of the probe mount hole 15 even if the probe 20 is pushed by the rotor 10. As a result, the folded portion of the wire 18 accommodated in the vertical hole 40A is cut. Further, since the vertical hole 40A extends along the rotating direction of the rotor 10 (see FIG. 7), the wire 18 is abraded gradually to be cut without being loosened even if it is brought into sliding contact with the rotor 10. Then, the unillustrated warning lamp is turned on to notify a driver thereof.

In the case that the probe 20 mounted on the support base 20 needs to be detached, the probe 20 may be rotated in a direction opposite to the direction when it is rotated to be mounted by gripping the handle 24. Then, the hooks 33 are pushed up by the rotary bars 23 to be disengaged therefrom, permitting the detachment of the probe 20.

As described above, the probe 20 can be attached and detached easily according to the mount construction of this embodiment. Therefore, an exchange can be performed efficiently even in the case that only the probe 20 needs to be exchanged.

The present invention is not limited to the described and illustrated embodiment, but the following embodiments also are embraced by the technical scope of the present invention as defined in the claims. Besides the following embodiments, a variety of other changes can be made without departing from the scope and spirit of the invention as defined in the claims.

Although the probe 20 according to the foregoing embodiment is provided with a pair of bulging portions (rotary bars 23), one, three or more bulging portions may be provided.

Although the bulging portions (rotary bars 23) of the foregoing embodiment are round bars, they may be, for example, projections.

Although the bracket 30 is made of a sheet metal in the foregoing embodiment, it may be made of a synthetic resin.

The wear detection probe according to the invention is used for the wear detection of the brake pad of a disk brake in the foregoing embodiment, it may be used for the wear detection of a brake pad of a drum brake.

What is claimed is:

1. A mount construction for holding a wear detection probe which is adapted to detect that a brake pad has been worn to its limit due to sliding contact with a rotor, the wear detection probe being inserted into a probe mount hole formed through a support base on the brake pad such that a detection end of the wear detection probe projects into the brake pad, said mount construction comprising:

a bracket fittable on a rear end of the wear detection probe substantially opposite from the detecting end thereof;

at least one guide in a position on the support base in proximity to the probe mount hole for displaceably supporting the bracket in directions substantially toward and from the support base, and at least one elastic member for biasing the bracket against the support base.

2. A mount construction according to claim 1, wherein the guide portion has a leading end, a receiving portion being formed at the leading end, and wherein the elastic member is provided so as to be biased between the receiving portion provided at the leading end of the guide portion and the bracket.

3. A mount construction according to claim 1, wherein the bracket is held in substantially close contact with portions of the support base adjacent the probe mount hole.

4. A mount construction according to claim 1, wherein the wear detection probe is attachable to and detachable from the bracket with the bracket mounted on the support base.

5. A mount construction according to claim 1, wherein the at least one guide portion comprises a plurality of bolts, the bolts having bolt heads, the at least one elastic member comprising a plurality of elastic members biased respectively between the bolt heads and the bracket.

6. A mount construction according to claim 1, wherein the flat bracket is mounted substantially around the probe mount hole and has an opening aligned with the probe mount hole, the wear detection probe being inserted through the opening and into the probe mount hole, and a plurality of hooks formed on the bracket adjacent the opening, the wear detection probe being formed with bulging portions that are engageable with the hooks in response to rotation of the wear detection probe after insertion into the probe mount hole.

7. A mount construction according to claim 6, wherein the wear detection probe further comprises a grip at a portion of the wear detection probe extending from the support base.

8. A mount construction for holding a wear detection probe which is adapted to detect that a brake pad has been worn to its limit due to sliding contact with a rotor, the wear detection probe having at least one bulging portion thereon and being inserted into a probe mount hole formed through a support base for the brake pad, the mount construction comprising:

flat brackets mounted substantially around the probe mount hole and each flat bracket being formed with an opening which is substantially alignable with the probe mount hole and through which the wear detection probe is permitted to be inserted into the probe mount hole, and at least one hook provided in a position on each said bracket adjacent to the opening so as to correspond in the mounted state to the bulging portion projecting from the wear detection probe, the hook being formed to engage with the bulging portion to lock the wear detection probe by rotating wear detection probe in a specified direction with the wear detection probe mounted in the probe mount hole, and receiving openings being formed on the hooks for receiving the bulging portions, the receiving openings being elastically deformably and normally sufficiently narrow to prevent the bulging portions from being disengaged from the hooks.

9. A mount construction according to claim 8, wherein the brackets (33) are provided with at least one accommodating portion (33A) which is bent substantially triangularly in a direction away from the support base (12) tangent to and at a location substantially to the opening (31).

10. A mount construction according to claim 8, wherein the brackets are provided with a guiding part obliquely extending in a direction away from the support base at a leading end of the bracket and tangent to the opening.

* * * * *